3,372,098
PROCESS FOR RECOVERING SOLVENTS FROM ELECTROLYTES
Alfred O. Walker, Lake Jackson, Tex., assignor to Nalco Chemical Company, Chicago, Ill., a corporation of Delaware
No Drawing. Filed Jan. 21, 1965, Ser. No. 427,104
7 Claims. (Cl. 204—59)

This invention relates to a process for recovering solvents from electrolytes, and more particularly to a process for recovering solvents from spent electrolytes obtained by electrolyzing an anhydrous solution of a Grignard reagent in an organic solvent for the Grignard reagent, using a sacrificial lead anode.

The manufacture of organo metallic compounds, and more specifically organo lead compounds, by electrolyzing an anhydrous solution of a Grignard reagent in an organic solvent for the Grignard reagent is disclosed in U.S. Patents 3,007,857 and 3,007,858. In the process disclosed in U.S. 3,007,858, an extraneous organic halide is added to the electrolyte. The term "Grignard reagent" refers to a complex organo magnesium compound which is commonly prepared by reacting magnesium with an organic halide. The term "organic halide" refers to organic chlorides, bromides and iodides. The halogen portion of the added organic halide does not have to be the same as the halogen portion of the Grignard reagent but in practice they are usually the same and the organic chlorides are most commonly employed because of their ready availability.

When lead is used as a sacrificial anode in an organic solvent solution of a Grignard reagent, organo lead compounds are formed. The cathode can be composed of any suitable conducting but non-reacting material, including, for example, ordinary steel, stainless steel, platinum, graphite, or the like. Ordinarily, the anode is composed of lead and the cathode of steel.

In carrying out the foregoing process, various organic solvents for the Grignard reagent can be employed. One type of solvent system which has been found to be satisfactory is one in which water miscible solvents such as tetrahydrofuran, which boil below the boiling point of the organic lead compound, are mixed with water immiscible solvents which boil above the boiling point of the organic lead compound, for example, the dibutylether of diethylene glycol or the hexylethylether of diethylene glycol, with or without water immiscible aromatic hydrocarbons, which boil about the same as or below the boiling point of the organic lead compound, e.g., toluene and/or benzene.

The end use of the organic lead compounds as antiknock agents in gasoline does not ordinarily permit the retention with the organic lead compounds of the solvents normally employed in producing them. Hence, it is necessary to separate these solvents in such a way that they can be re-used in subsequent processing operation. This separation is not easy because the organic lead compounds are sensitive to heat and concentration, or, in other words, tend to become unstable under some conditions that might ordinarily be encountered in recovery procedures. The separation is rendered more difficult where both water miscible and water immiscible solvents are present. These solvents not only have to be separated from the organic lead compound but also, for practical reasons, have to be restored to a condition where they can be re-used in the electrolysis. Furthermore, the Grignard reagent used in the electrolysis forms magnesium halide as a by-product and the excess Grignard remaining in the spent electrolyte is destroyed by water thereby forming magnesium halide. Hence, if water is used in the recovery procedures the resulting magnesium halide brine must be removed.

In one type of recovery system, the spent electrolyte, which contains a magnesium halide in addition to the organic lead compound and one or more organic solvents, is subjected to steam distillation, thereby introducing substantial quantities of water into the recovery system. This water forms a brine with the magnesium halide, e.g., magnesium chloride. Where the organic lead compound, for example, tetramethyl lead, is distilled by steam distillation from the spent electrolyte, the residue will contain any water immiscible high boiling solvents together with the aforesaid brine. Since these water immiscible high boiling solvents are expensive materials, the process is only economically feasible if they can be recovered. Heretofore it has been found that solvents such as the hexylethylether of diethylene glycol are soluble to a slight extent (less than 100 parts per million) in the brine and in recovery operations heretofore employed, wherein the volume ratio of the hexylethylether of diethylene glycol to brine was approximately 1:8 to 1:9, about 2–3% by volume of the hexyethylether of diethylene glycol has been lost by entrapment in the brine waste. The loss is due to the presence of very fine droplets of the solvent which are too small to rise to the surface in any reasonable time. In such cases the quantity of water immiscible organic liquid mixed with the brine is usually less than 20% by volume.

One of the objects of the present invention is to provide a new and improved recovery system for use in a process of the type described wherein a greater proportion of water immiscible solvent is recovered.

A more specific object of the invention is to provide a new and improved process for recovering the hexylethylether of diethylene glycol from brine which results from a recovery system for organic lead compounds; more particularly in a recovery system used in the manufacture of tetramethyl lead. Other objects will appear hereinafter.

In accordance with the invention, it has been found that new and improved results are obtained in the recovery of water immiscible organic liquids such as, for example, water immiscible diethers of glycol from brines containing magnesium halides by increasing the relative proportion of such ethers in such brine and preferably by adjusting the ratio of ether to brine within a range of 40–60% by volume of ether to 60–40% by volume of brine, thereafter agitating to form an unstable emulsion and settling or otherwise separating the brine frome the mixture.

In the process vigorously agitating the mixture of diether and brine produces an unstable emulsion. The emulsion will break cleanly and remove the fine droplets of diether from the brine as it breaks. If the mixture is not mixed with additional diether to form a good (but not stable) emulsion no diether removal from the brine is obtained. The additional water immiscible diether, for example, the hexylethylether of diethylene glycol, makes it possible to reduce the entrainment of the water immiscible diether in the brine from 2% to 3% to less than 1%. While the invention is not limited to any theory, it is possible that the additional diether acts as a deemulsifier or emulsion breaker, thereby producing a clean break between the aqueous and non-aqueous phases so that one can be separated from the other by decantation or otherwise.

In a preferred embodiment, the amount of water immiscible diether added to the magnesium halide brine is sufficient to produce an approximately 1:1 volume ratio of ether to brine. In another preferred embodiment, the brine after extraction of the water immiscible diether therefrom is subjected to a second extraction with an aromatic hydrocarbon solvent, preferably with an equal volume of toluene. Here again, the formation of an unstable emulsion is essential. The emulsion can be produced by pumping the mixture of diether, toluene and brine through an orifice. In a recovery operation involving the use of the hexylethylether of diethyelne glycol as the water immiscible diether in a 1:1 volume ratio of ether to brine and a second extraction of the brine with a 1:1 volume ratio of toluene to brine, the amount of the hexylethylether of the diethylene glycol remaining in the discarded brine after the second extraction is about 10–50 parts per million.

In carrying out this process the brine can be, and preferably is, acidized with hydrochloric acid or other neutralizing agent capable of converting magnesium oxyhalides to magnesium halides. The pH of the acidified mixture should preferably be about 4 and in any case insufficient to destroy the diether. This acidification when employed is preferably effected before the additional proportion of water immiscible diether of the glycol is added. However, the acidification can be carried out before or after the addition of the water immiscible diether of the glycol. The acidification is preferably carried out to remove the solids which might tend to stabilize the emulsion.

The best mode contemplated for the practice of the invention is illustrated by the following examples in which the quantities are given in parts by weight unless otherwise indicated:

*Example I*

The process can be carried out in various types of cells, but one cell which has been found to be particularly suitable is a pipe cell made from a steel pipe filled with lead pellets which form the anode material. The outer boundaries of the lead pellets are separated from the inside of the pipe which forms the cathode by means of a foraminous partition or liner made of fine mesh woven polypropylene filaments or other suitable material which is electrically non-conducting and insulates the cathode from the anode pellets.

The appartus is equipped with a recirculating system including a pump whereby the electrolyte can be pumped externally of the cell through a heat exchanger in order to control the temperature. The temperature can also be controlled by provindg a cooling jacket around the cell.

A Grignard solution is prepared by reacting magnesium with methyl chloride in an organic solvent mixture consisting of the hexylethylether of diethylene glycol and tetrahydrofuran. To prepare the Grignard solution, 185 parts of the hexylethylether of diethylene glycol, 97.5 parts of tetrahydrofuran, 11.4 parts of toluene, 16 pounds of magnesium and 34 parts of methyl chloride are mixed at 33° C. to 39° C. under pressure of 5 p.s.i.g., the methyl chloride being added gradually over a 3½ hour period. An excess of methyl chloride is used sufficient to give an additional methyl chloride concentration of 0.3 mol per mol of Grignard reagent. Of the total organic solvents present, about 35% by weight is tetrahydrofuran and about 65% by weight is the hexylethylether of diethylene glycol.

The electrolyte is pumped through the cell at a rate of 4 gallons per minute.

The electrolysis process is carried out at a temperature of approximately 40° C. at an average current density of 8–10 amperes per square foot until approximately 95% of the Grignard reagent has been converted to tetramethyl lead.

The spent electrolyte is passed through a stripping tower to remove excess methyl chloride and the resultant product is run into a steam distillation apparatus where the tetramethyl lead is removed by steam distillation. The toluene can also be added to the spent electrolyte after electrolysis in an amount corresponding to about 0.16 mole (and in some cases up to 0.5 mole) of toluene per mol of magnesium. Since toluene has about the same boiling point as tetramethyl lead, it is carried over as a part of the distillate containing tetramethyl lead during the recovery process, and serves to stabilize the tetramethyl lead.

The residue in the steam distillation apparatus consists of a water miscible phase, which is also brine phase, and a water immiscible phase which is mainly the hexylethylether of diethylene glycol. Due to the addition of water in the steam distillation, the volume ratio of the hexylethylether of diethylene glycol to brine is approximately 1:8. This ratio is now adjusted by adding an adidtional quantity of the hexylethylether of diethylene glycol sufficient to produce a volume ratio of 1:1. The mixture is vigorously agitated and the resultant unstable emulsion is pumped into a separation tank where it is allowed to settle to form two phases. Thereafter, the water immiscible phase containing the hexylethylether of diethylene glycol is separated from the aqueous brine phase and the hexylethylether of diethylene glycol, after being converted to anhydrous state, is re-used again in the process.

*Example II*

The procedure was the same as in Example I except that the magnesium chloride brine after being separated from the hexylethylether of diethylene glycol was extracted with toluene by emulsifying it with an equal volume of toluene. This emulsion was not stable but the mixture of fine droplets of the emulsion permitted the ether droplets to contact each other and separate cleanly. The toluene extract was then re-used in the process.

The process is applicable to removal of any immiscible organic liquid from water or bine. The invention is especially applicable to solvent systems in which a magnesium halide brine is separted from a water immiscible diether of a glycol. The diether glycol solvent is preferably a water immiscible liquid diether of a polyalkylene glycol. Typical examples of preferred organic ethers for the purpose of the present invention are those having the formulae:

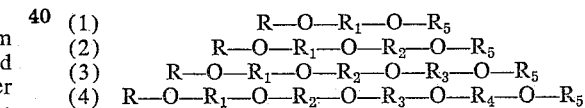

where the radicals R and $R_5$ are hydrocarbon radicals and at least one of them contains at least six carbon atoms and the radicals $R_1$, $R_2$, $R_3$ and $R_4$ are alkylene radicals containing two to six carbon atoms. Thus, one of the radicals R or $R_5$ can be hexyl and the other ethyl; one can be hexyl and the other propyl or isopropyl; one can be hexyl and the other butyl, secondary butyl, isobutyl or tertiary butyl; one can be hexyl and the other amyl or isoamyl; or both can be hexyl; or one can be benzyl and the other ethyl, or one can be phenyl and the other ethyl; or both can be phenyl. The radicals $R_1$, $R_2$, $R_3$ and $R_4$ are preferably ethylene but can be propylene, 1,2-propylene, butylene, amylene or hexylene. A preferred solvent for the purpose of the invention is the hexylethylether of diethylene glycol, the hexylpropylether of diethylene glycol, the hexylbutylether of diethylene glycol, the hexylamylether of diethylene glycol, the hexylethylether of dipropylene glycol, the diphenyl ether of tetraethylene glycol, the benzyl ethyl ether of triethylene glycol, or a homologue thereof. In general, the radicals R, $R_1$, $R_2$, $R_3$, $R_4$ and $R_5$ should be composed of hydrocarbon radicals of such configuration and general length, either straight or branched or cyclic, that the solvent is normally liquid under the conditions of reaction and preferably normally liquid at 20° C.

The invention is hereby claimed as follows:

1. In an electrolytic process wherein a mixture of a non-aqueous water immiscible organic liquid is separated from an aqueous brine in which at least 1% by volume of said liquid normally remains entrained when said liquid and said brine are mixed, the improvement which comprises increasing the amount of said liquid in said process to a point where an unstable emulsion is formed when said mixture is agitated, agitating said mixture to form said unstable emulsion, and thereafter separating the non-aqueous phase from the brine phase.

2. In an electrolytic process wherein a mixture of a non-aqueous water immiscible diether glycol liquid is separated from an aqueous brine in which at least 1% by volume of said liquid normally remains entrained when said liquid and said brine are mixed, the improvement which comprises increasing the amount of said liquid in said process to a point where an unstable emulsion is formed when said mixture is agitated, agitating said mixture to form said unstable emulsion, thereafter allowing the mixture to settle thereby forming an aqueous phase and a non-aqueous phase, and separating said phases.

3. In the manufacture of organic lead compounds by a process wherein an electrolyte comprising an anhydrous solution of a Grignard reagent in a water immiscible diether of a glycol is electrolyzed, using a sacrificial lead anode and the residual electrolyte containing a water insoluble organic lead compound is passed into a recovery system in which it is brought into contact with water, thereby forming a magnesium halide brine mixed with said water immiscible diether glycol, the improvement which comprises adding an additional quantity of said water immiscible diether glycol to said mixture of magnesium halide brine and water immiscible diether glycol, agitating the mixture to form an unstable emulsion, and thereafter separating said brine.

4. A process as claimed in claim 3 in which said brine after being separated from said mixture is extracted with a liquid aromatic hydrocarbon solvent by the same procedure of emulsion formation and separation.

5. A process as claimed in claim 3 in which said diether glycol is the hexylethylether of diethylene glycol.

6. A process as claimed in claim 3 in which the additional quantity of said water immiscible diether glycol is sufficient to give a volume ratio of said diether glycol to brine within the range of 40-60% by volume of said diether glycol to 60-40% by volume of said brine.

7. A process as claimed in claim 6 in which the volume ratio of said diether glycol to said brine is approximately equal.

References Cited

UNITED STATES PATENTS 3,118,825    1/1964    Linsk _____ 204—59

HOWARD S. WILLIAMS, *Primary Examiner.*